Dec. 21, 1943.   S. T. HOWARD   2,337,046
ANTISPLASH LID FOR RECEPTACLES
Filed June 27, 1941
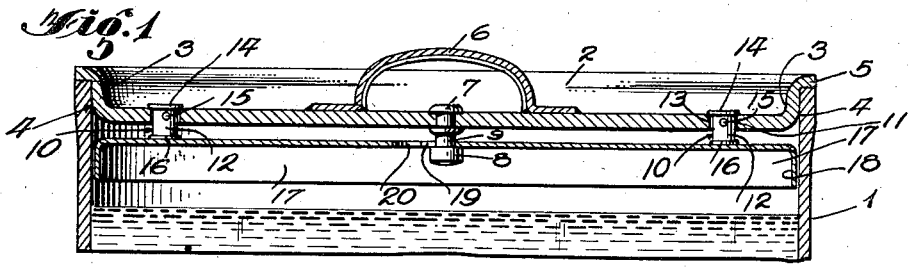
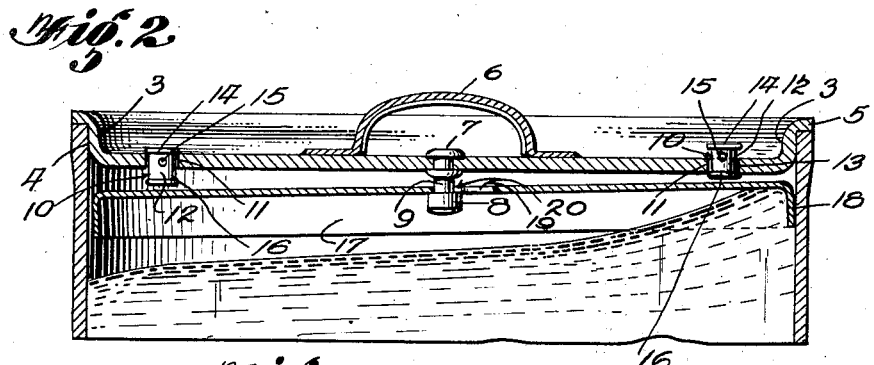
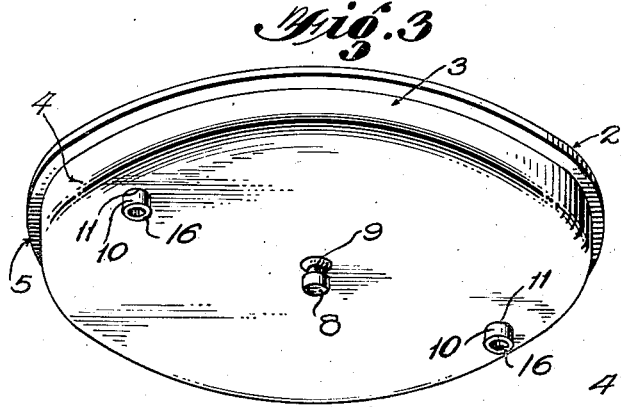
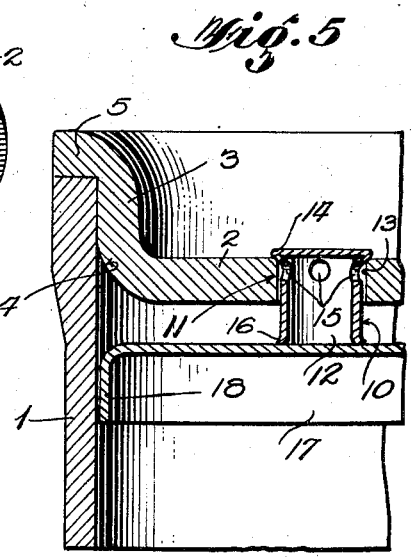
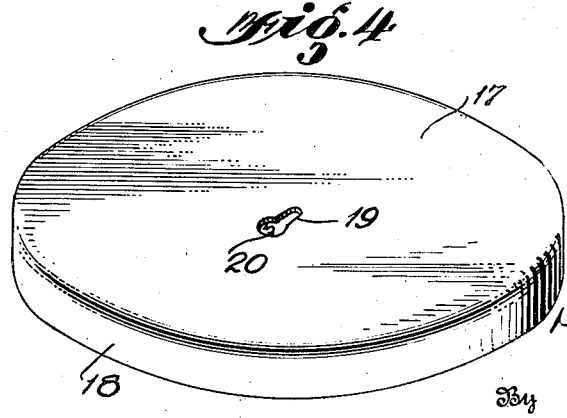
Inventor
Styles T. Howard
By
Attorney Patented Dec. 21, 1943

2,337,046

UNITED STATES PATENT OFFICE 2,337,046

ANTISPLASH LID FOR RECEPTACLES

Styles T. Howard, Jeffersonville, Ind.

Application June 27, 1941, Serial No. 400,058

2 Claims. (Cl. 220—44)

(Granted under the act of March 3, 1883, as amended April 30, 1928; 370 O. G. 757)

The invention described herein, if patented may be manufactured and used by or for the Government for governmental purposes without the payment of any royalty thereon.

This invention relates to anti-splash covers and more particularly to covers for containers, the contents of which are partly or entirely liquid and are intended for use during cooking operations on vehicles while in transit at high speed and over rough surfaces, such as in Army use when preparation of food for troops is required on the march.

An object of this invention is to provide a simple, durable and inexpensive construction in such sizes as will fit and operate on standard size receptacles which may be purchased as a part of the receptacle, or as a separate item for use on receptacles when required.

Another object is to provide an anti-splash cover that will effectively prevent the splashing over of the contents of a receptacle that does not require any of the various means in general use to retain the cover in place.

A further object is to provide a structure wherein the surge of the liquid of the container functions to bring about a seal between a splash shield and the side of the receptacle to prevent overflow of the liquid.

A further object is to provide means whereby the movement of the splash shield is facilitated by breathers or vents adapted to admit or discharge air from between the splash shield and the cover as required, due to the oscillation of the splash plate.

A further object being to provide for contact between the splash plate and the side of the receptacle that by frictional contact therewith will tend to prevent the lifting of the lid from its place and escape of the liquid contents of the container.

A further object being to provide a structure wherein the parts may be separated and readily kept in a sanitary condition.

Another object of this invention is to provide a structure in which the parts are arranged in such a manner as to be protected from injury during use.

The above and other objects in view will appear in the following specification and be fully pointed out in the claims.

A preferred embodiment of this invention is shown, but it will be understood that slight changes in form and minor details of construction may be resorted to without departing from the spirit of the invention, or fall beyond the scope of the claims.

Similar numerals indicate corresponding parts in all the figures of the drawing in which:

Fig. 1 is a vertical section of the upper portion of a receptacle showing the improved anti-splash cover in place.

Fig. 2 is a similar view, showing the receptacle slightly tilted, the liquid within the receptacle surged against one side of the splash shield, and the space between the flange of the shield and adjacent side of the receptacle closed and sealed.

Fig. 3 is a perspective view, showing the underface of the cover member and the breathers or vents and splash shield supporting stud.

Fig. 4 is a perspective view of the splash shield.

Fig. 5 is an enlarged detailed section through one of the vents, and adjacent edges of the cover member and splash shield.

Reference now being had to the drawing by numerals: 1 indicates a receptacle, a comparatively heavy cover 2 is provided with a vertically extending flange 3 having a circumferential outer surface 4 adapted to snugly fit into the upper end of the receptacle a sufficient distance to require a direct axial movement of the cover when seating it in or removing it from the receptacle. At the upper edge of flange 3 is a horizontal outwardly extending flange 5 adapted to rest on the edge of the receptacle 1 and provide as nearly as possible a perfect contact throughout between the under surface of flange 5 and the upper edge of the receptacle 1. The significance of the arrangement of the above parts will appear later. The cover member is provided with a handle 6 to facilitate the removal of and adjustment into place of the cover.

Centrally mounted in the cover member is a stud 7 depending therefrom, having an enlarged head 8 and a reduced or neck portion 9. The cover 2 is further provided with a plurality of vents 10, two being shown near the outer, opposite edges of the cover, said vents consist of openings 11 in the cover in which are arranged for vertical movement, hollow valve members 12. Said hollow valve members 12 loosely fit openings 11 in the cover, thus providing air passages 13 between the outer surface of said hollow members and openings. The valve members are further provided with flanges 14 at their upper ends adapted to normally rest over and form a closure for the passage of air from above or outside of the cover. Directly below flanges 14 in the sides of the hollow valve members are a series of horizontally arranged openings 15, having a considerable combined area, adapted under certain conditions to provide for the free and rapid passage of air around the hollow valve member and also through same and openings 15. The hollow valve members are slightly flared at their lower ends as shown at 16, to prevent their accidental removal from the cover openings. The free passage of air through cover 2 in one direction at times, and the cutting off of flow of air in the other direction at other times, will be more fully covered later.

Suspended beneath the cover is a splash shield 17, said shield being constructed preferably of thin non-corrosive metal, provided at its edge with a depending flange or apron 18 adapted to loosely fit the interior of receptacle 1. Shield 17 is further provided with a bayonet slot 19, terminating in the center of the shield, of a size to receive the neck portion 9 of the stud 7. Said slot 19 extends from the center of the shield a short distance and is provided with an enlarged portion 20 adapted to pass over head 8 of the stud 7, the shield may then be shifted into axial alignment with the cover member, in which position it is retained when the cover and shield are placed in the top of the receptacle. The shield is suspended a distance below the cover, and when the receptacle is in its normal upright, untilted position, the shield will be suspended in a horiozntal position with the hollow valve members resting on top of the shield, and flanges 14 closing the space between the valve member and its opening 11 in the cover to exclude the entrance of foreign matter, and the openings 15 of the valve members sheathed within said opening 11.

The level of liquid in the receptacle is a short distance below the splash shield to permit rocking of the shield. An air chamber 21 is provided between cover member 2 and the shield, the function of said chamber will appear in the following description of the operation.

The operation is as follows: By reference to Figure 1 of the drawing, it will be seen that the parts of the invention and the liquid contents of the receptacle are in normal undisturbed positions.

Figure 2 shows the receptacle tilted, the liquid contents surged to one side of the receptacle, forcing the flange or apron 18 against the inner face of the receptacle and the adjacent hollow valve member of the vent up, providing a clear air passage around the hollow member and through same, out through openings 15 which have been lifted above the upper surface of the cover. The surge of the liquid when it contacts the shield causes it to rapidly rise, the air in the chamber 21 between the shield and cover in its forced escape out of that side of the chamber, will first pass through space surrounding the valve member 12 and lift it into the position shown at the right in Fig. 2, with the open lower end of the hollow valve, openings 15 and space around the valve member 12 open for the free passage of air, with practically no interference to its flow. Said movement of the shield, which is mounted loosely on stud 7, will cause its flange to come into frictional contact with the inner wall of the receptacle, and form a seal against the passage of liquid beyond the shield.

The passage of liquid will be prevented, not only at the point of first contact of the flange of the shield with the inner wall of the receptacle, but due to the flexible nature of the flange it will at once assume along its lower edge, the inner arc of the wall of the receptacle, which is only slightly greater than the edge of the flange, which will cause a firm frictional contact between the flange and receptacle wall, and cause a tight seal between the parts throughout a long segment thereof. The frictional contact between the flange of the shield and the inner wall of the receptacle will increase as the pressure of the liquid against the shield increases.

Forces other than those above described tending to prevent overflow of the contents of the receptacle are present when practicing this invention, namely, it will be understood by reference to Fig. 2 of the drawing that the sudden raising of the shield on the right by the flow of the liquid in that direction, and the opening of the valve for free passage of air through the valve at that portion of the receptacle prevents the air between the shield and the lid of the receptacle from lifting the lid.

It will be further understood that the upward rocking of the shield at the right will cause the left hand portion of the shield to be depressed, the liquid thereunder having flowed to the other side of the receptacle, said rapid lowering of the shield will tend to set up a partial vacuum or suction downwardly of the air above the shield, with the result that the valve on the left will close tight with its flange 14 closing the opening 11 and openings 15 below the upper edge of the shield. The partial vacuum or downward suction at the left side of the lid will tend to draw the lid downwardly at that side on top of the receptacle and if the lid is drawn down on top of the receptacle at one point, the same effect will be imparted throughout the entire periphery of the lid. Said downward movement of the shield and the above mentioned downward suction of the air at the left side of the receptacle, and its tendency to hold the lid down on that side, will be augmented by the connection of the shield with the lid at their centers. In other words, downward movement of the left of the disk will exert downward pull on the stud of the lid, and assist in the holding down of the lid.

Having fully described my invention what I claim and desire to secure by Letters Patent is:

1. The combination with a circular receptacle for liquids, having a lid adapted to rest on top of the receptacle, one-way air vents, arranged adjacent to the outer edge of the lid, and a headed stud depending from the center of the lid, of a splash plate having a depending flange of thin flexible metal at its outer edge loosely fitting within the receptacle, and mounted for universal movement on said stud and an air space between said plate and the lid adapted when the liquid in the receptacle contacts the plate, its flange will contact the inner face of the receptacle and by friction therewith prevent further upward movement of the plate and the liquid.

2. The combination with a circular receptacle for liquids, having a lid adapted to rest at the top of the receptacle, one-way air vents consisting of hollow members loosely mounted for vertical movement in openings in the lid having upper flanges adapted when lowered to close the space between the hollow member and its opening in the lid, and a series of openings in the upper portion of the hollow member for free passage of air when raised and closed when lowered, arranged adjacent to the outer edge of the lid and a stud depending from the center of the lid, of a splash plate of thin flexible metal having a depending flange loosely suspended for universal movement on said stud within the receptacle with a space between the plate and lid adapted, when the liquid in the receptacle contacts the plate, its flange will contact the inner face of the receptacle and by friction therewith prevent further upward movement of the plate and the liquid.

STYLES T. HOWARD.